April 17, 1962 E. A. GIBBONS 3,030,517
LASH COUPLING DEVICE FOR AN ELECTRICAL APPARATUS
Filed Nov. 20, 1959 2 Sheets-Sheet 1
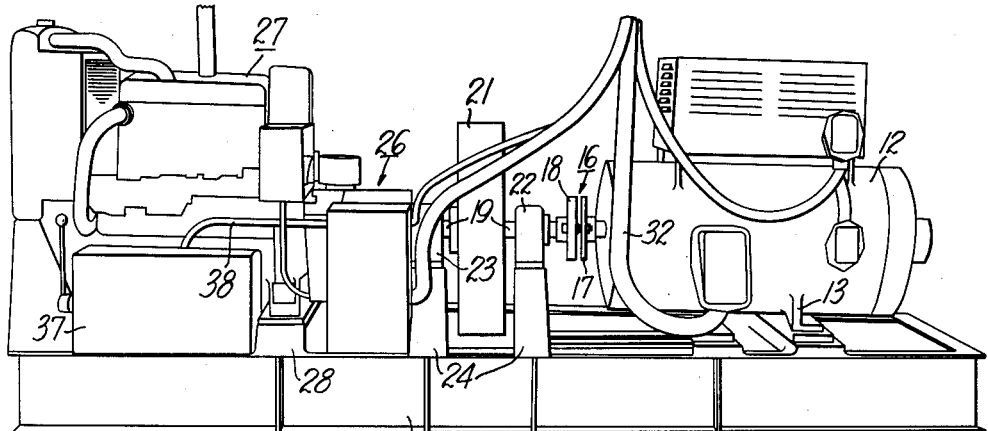
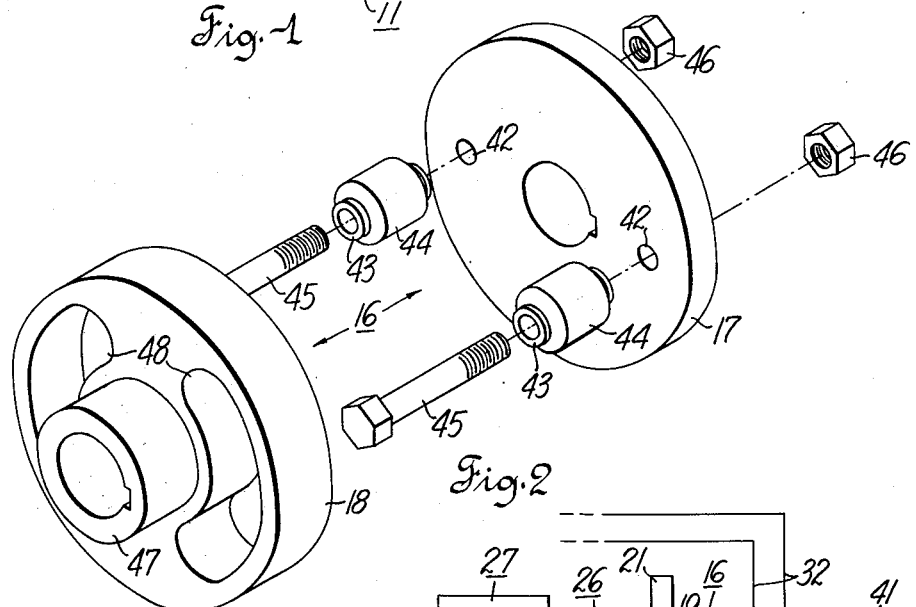
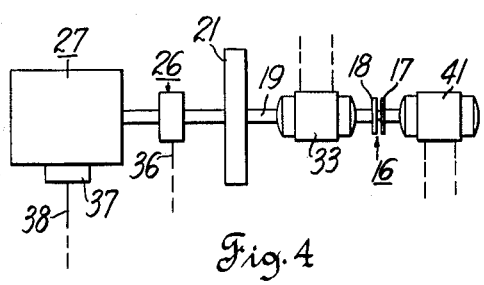
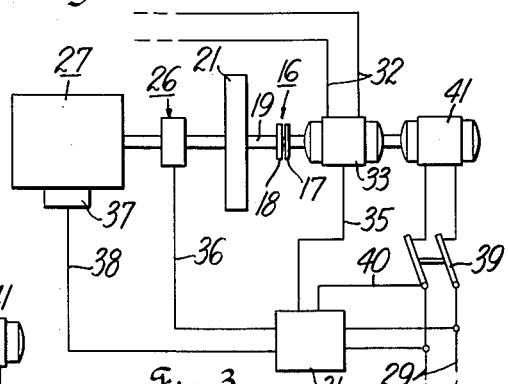
Inventor
Edward A. Gibbons
by John P. Hinge
Attorney April 17, 1962 E. A. GIBBONS 3,030,517
LASH COUPLING DEVICE FOR AN ELECTRICAL APPARATUS
Filed Nov. 20, 1959 2 Sheets-Sheet 2

Inventor
Edward A. Gibbons
by John P. Hines
Attorney

United States Patent Office 3,030,517
Patented Apr. 17, 1962

3,030,517
LASH COUPLING DEVICE FOR AN ELECTRICAL
APPARATUS
Edward A. Gibbons, Dolton, Ill., assignor to Allis-Chalmers Manufacturing Company, Milwaukee, Wis.
Filed Nov. 20, 1959, Ser. No. 854,307
4 Claims. (Cl. 290—4)

This invention pertains to emergency electric power systems sometimes referred to as no break engine generator sets.

In many instances, it is desirable to provide an emergency electric power system which will automatically supply auxiliary electric power when the utility power source fails or falls below its normal output. It is usual to have such emergency power systems in hospitals, communication centers, industrial plants, etc. One type of emergency power system consists of a motor, a generator, a flywheel, a magnetic clutch and an internal combustion engine all coupled together in one rotating system. When the utility power source is in normal operation the magnetic clutch is deenergized to disengage the engine from the system. In this condition the utility power drives the motor which in turn rotates the generator to supply the electric current to a load. In case of interruption of utility power, the magnetic clutch is energized by the generator causing the clutch to engage connecting the engine to the rotating system. The flywheel has sufficient inertia mass to start the engine and supplies rotative force to the generator. The engine then drives the generator to supply the load with the necessary electrical power. When the utility power is reinstated, the magnetic clutch is deenergized disengaging the clutch and thereby disconnecting the engine from the rotating system. The motor is then supplied utility power and drives the generator supplying the load.

In many instances it is necessary that the generator rotate at a constant speed so as to supply current at sixty cycles per second. This is particularly important in connection with communication systems. In communication systems any current that is supplied at more or less than sixty cycles imposes a hum component to the signal being transmitted. If this hum component is not filtered the signal being transmitted will be distorted. If a number of communication stations each introduce a slight hum component which is additive the resulting signal may be distorted to a point where it would be unintelligible to the receiving station.

In emergency power systems of the type above described induction type motors have previously been used to drive the generator. Since an induction type motor is always running at some slip speed the output from the generator is less than sixty cycles. It would be desirable to provide an emergency power system with a synchronous motor since this type of motor rotates at a constant speed. This would insure a constant sixty cycle output from the generator.

Previous to applicant's invention it has been impractical and in some cases impossible to use a synchronous type motor because of undesirable torque characteristics of such a motor. In an engine driven emergency power system it is necessary to have a large flywheel in the rotating system in order to crank the engine when the utility power fails. When the utility power is again supplied the engine is disengaged and the rotating system is likely to fall from sixty cycle operation to fifty-nine or fifty-nine and one-half cycle operation. With a synchronous type motor, because of its low torque characteristics at a rotative speed slightly less than synchronous speed, the synchronous motor cannot accelerate the system flywheel up to synchronous speed. In an emergency power system requiring a motor of fifteen to twenty horsepower to drive the load at synchronous speed it is possible that a synchronous motor of from two hundred to three hundred horsepower would be required to accelerate the system flywheel, depending on the size of the flywheel, from some speed below synchronous speed up to synchronous speed. It can be seen that this considerably larger motor would add to the cost of the emergency power system and in some instances would be prohibitive due to the size of the motor.

It is an object of the present invention to provide an emergency power system having a synchronous type motor of a size to rotate the system at synchronous speed with means that will permit the motor to accelerate the system from some speed less than synchronous speed to synchronous speed.

An additional object of the invention is to provide an emergency power system of the above described type with a lash coupling between the system flywheel and the synchronous motor which will permit a limited amount of relative rotation between the flywheel and the synchronous motor rotor.

Another object of the invention is to provide a lash coupling between a synchronous motor and a load which allows relative rotation between the load and motor in an amount equal in mechanical degrees to the distance in mechanical degrees between positions of maximum forward torque of the motor.

The foregoing and other objects and advantages of the invention will become more apparent as the following description is read in light of the accompanying drawings wherein:

FIG. 1 is a side elevation perspective of a no break generator set including a lash coupling;

FIG. 2 is an exploded view of a preferred type of lash coupling;

FIG. 3 is a block diagram of the no break generator set;

FIG. 4 is a modified view of FIG. 3 showing the lash coupling positioned between the motor and generator.

Figure 5:
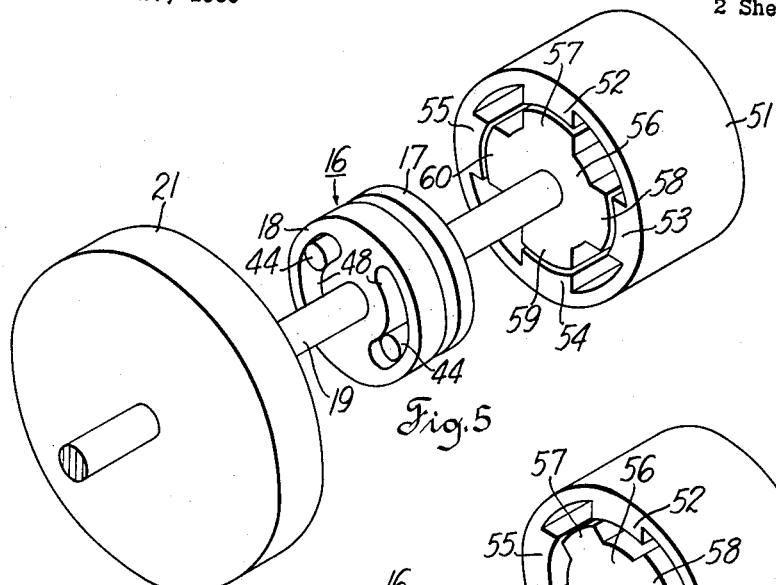
FIGS. 5, 6 and 7 are isometric views showing various relationships between the synchronous motor rotor and stator, the lash coupling and flywheel.

Referring to FIG. 1, a base or skid frame generally designated 11 is provided on which the components of the no break generator set are mounted. A housing 12 contains a synchronous type motor coupled to a generator for rotation therewith. The motor generator housing is provided with lugs 13 which connect the motor generator housing to the skid frame 11 in any conventional manner. A lash coupling or lost motion means generally designated 16 is composed of two coupling elements 17 and 18. One coupling element 17 is nonrotatably connected to the generator shaft while the other coupling element 18 is nonrotatably connected to one end of a flywheel shaft 19. The shaft 19 is journaled in bearings 22 and 23 disposed on either side of a flywheel or rotatable inertia mass 21 which is connected to the shaft 19 for rotation therewith. Each bearing is supported on a pedestal 24 which is rigidly connected to the skid frame. The other end of the flywheel shaft 19 is connected to a magnetic clutch generally designated 26, of any conventional type which is engaged when current to the clutch is interrupted and disengaged when current is supplied to the clutch. The crankshaft (not shown) of a diesel engine is connected to the other side of the magnetic clutch 26. The diesel engine generally designated 27 is mounted on pads 28 provided on the skid frame in the usual engine mounting manner.

Referring to FIG. 3, utility electric power supply lines 29 supply utility power to automatic controls 31 and to a synchronous motor 41. Load or output cables 32 supply electric power to a load from the generator 33. The generator is also electrically connected to the controls by the cable 35 to provide the controls with current when the utility power fails. The magnetic clutch 26 is supplied with current from the controls 31 by the cable 36. An engine control 37 for the diesel engine 27 is supplied with current by the cable 38. A switch 39 electrically connected to the automatic controls 31 by the switch line 40 controls the utility power to the synchonous motor 41.

An advantageous arrangement of the elements of the no break set is shown in FIG. 4. In this arrangement the lash coupling 16 is positioned between the motor 41 and generator 33 and the generator is connected to the shaft 19 for rotation with the flywheel 21. With this arrangement fluctuations in the output from the generator will be at a minimum because of the relatively constant speed of rotation of the flywheel.

Referring to FIG. 2, a preferred form of the lash coupling of the subject invention is shown comprising generally disk shaped coupling elements 17 and 18. The generator coupling element 17 is provided with a hub having a bore with a broached keyway for attachment to the generator shaft for rotation therewith. The generator coupling element 17 is also provided with two through holes 42 which are preferably circumferentially spaced 180 degrees apart and each radially positioned intermediate the outside circumference of the coupling element and the bore. The lash coupling 16 is provided with two torque transmitting elements which comprise a metallic sleeve 43 to the outside circumference of which is bonded a resilient bumper 44. Two cap screws 45 are provided having an outside diameter of a size to permit a slip fit with the inside diameter of the sleeves 43. Each cap screw is passed through the sleeve 43 of a bumper and also through a hole 42 in the coupling element 17. Nuts 46 are then turned onto the threaded portion of the cap screws 45 to hold the bumpers 44 tightly against the generator coupling element 17. The other or flywheel coupling element 18 has a hub 47 with a bore and a broached keyway therethrough which allows a torque transmitting connection to the flywheel shaft 19. Two oppositely disposed arcuate slots 48 are provided in the flywheel coupling element 18. These arcuate slots are of such a width as to allow movement of the bumpers 44 in the slots without contact of the bumpers with the sides of the slots. The coupling elements are unbiased relative to one another thereby permitting independent relative rotation as the rollers 44 move between opposite ends of slots 48. As shown in FIG. 1 the two coupling elements 17 and 18 are positioned relative to one another so that a slight axial clearance is provided therebetween.

Referring to FIG. 5 the synchronous motor 41 disclosed herein for illustration is composed of a four pole stator 51 having poles 52, 53, 54, 55 and a four pole nonpolarized rotor 56 having poles 57, 58, 59, 60. That is, each rotor pole is attracted to both north and south stator poles. The relative positions of the stator poles and rotor poles shown in FIG. 5 indicate a position of maximum forward torque of the rotor. That is, when the rotor poles are exactly aligned with the stator poles a maximum amount of magnetic attraction is exhibited by the stator on the rotor and a maximum condition of forward torque exists. It is recognized that a slight shifting of the rotor relative to the stator will occur when maximum torque is exhibited by the rotor. However, for the purpose of explaining this invention this slight shift can be discounted.

Figure 6:
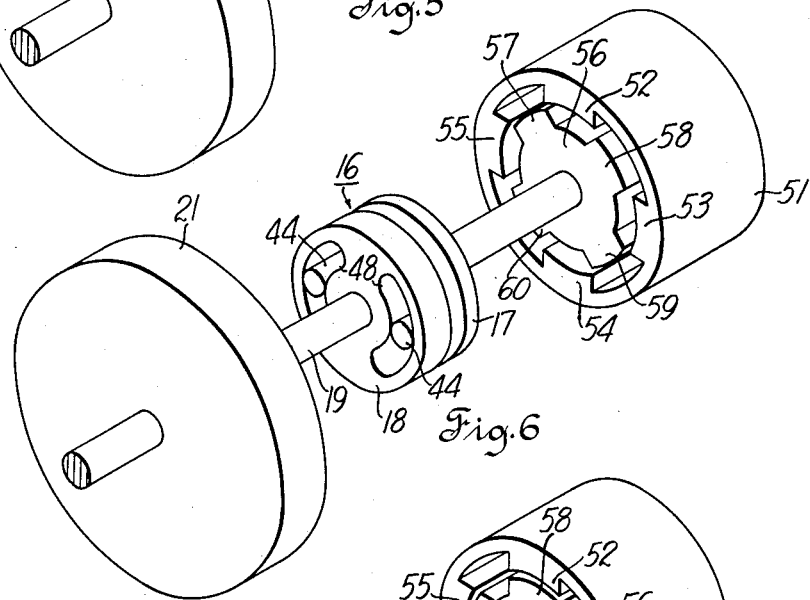
Figure 7:
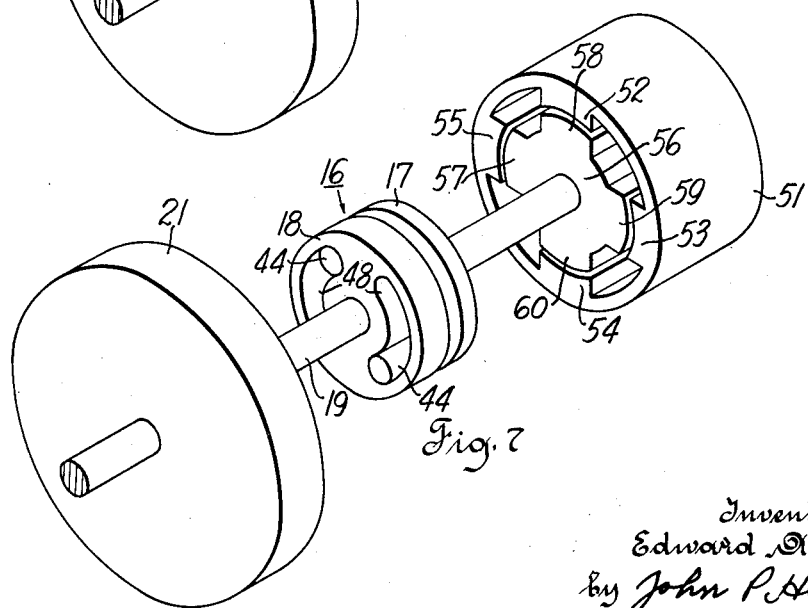

In FIG. 6 the rotor poles are midway between the stator poles and the rotor is in a position of minimum forward torque because a minimum magnetic attraction exists between the stator and rotor poles. In a four pole machine such as illustrated herein, ninety degrees of mechanical rotation of the rotor relative to the stator is necessary for the rotor to move from a position of maximum forward torque (FIG. 5) through a position of minimum forward torque (FIG. 6) to the next position of maximum forward torque (FIG. 7). This is shown by the relative positions of the stator and rotor poles. In FIG. 5 the rotor pole 57 is aligned with the stator pole 52. In the next position of maximum forward torque (FIG. 7) the stator pole 52 is aligned with rotor pole 58. It can thus be seen that in this particular machine the rotor has moved ninety mechanical degrees from one position of maximum forward torque to the next position of maximum forward torque.

The operation of the emergency electric power system will now be described. It should be understood that the automatic controls, fuel controlling apparatus and governor referred to herein form no part of this invention. When the system is running in its normal manner utility power is directed through the lines 29 to the automatic controls 31 and to the synchronous motor 41 through the switch 39. The motor in turn drives the generator 33 which supplies the current to the load through the load lines 32. The automatic controls de-energize the magnetic clutch 26 disengaging this clutch and disconnecting the diesel engine 27 from the system. The controls also prevent operation of the engine by actuating suitable means such as fuel controlling apparatus (not shown) to a fuel cutoff condition. When the utility power fluctuates to a predetermined extent or is interrupted the motor no longer operates at synchronous speed and the following three conditions occur simultaneously: (1) power to the motor switch 39 is interrupted which opens the switch disconnecting the motor from the utility line; (2) power to the magnetic clutch 26 is established which engages this clutch connecting the engine crankshaft with the system rotating flywheel 21; and (3) the engine control is energized thereby actuating the fuel controlling apparatus to a fuel supplying condition allowing the engine to be started. When the engine crankshaft is connected to the flywheel, the engine is cranked by energy stored in the rotating flywheel and begins to run. At this point the engine is operating the system and the generator driven by the engine supplies the load and the controls with the necessary current. The engine is provided with a governor which insures rotation of the generator at a speed which will supply sixty cycle current.

When the utility line is again supplying sixty cycle current and the proper voltage to the controls, magnetic clutch 26 disengages the clutch and disconnects the engine 27 from the rotating system. At the same time the engine fuel controlling apparatus shuts off the fuel thereby stopping the engine. Coincident with this, the automatic controls supply current to the motor switch 39 closing the switch and allowing the sixty cycle current to be supplied to the synchronous motor. At this point the synchronous motor attempts to drive the system including the generator and flywheel at synchronous speed. If we assume that the engine had been driving the system flywheel at 1800 revolutions per minute, during the changeover, from the system being driven by the engine to the system being driven by the synchronous motor, the system flywheel will decelerate to, for instance, 1790 revolutions per minute. It is then necessary for the synchronous motor to accelerate the flywheel back up to 1800 revolutions per minute in order to provide the sixty cycle current to the load from the generator.

If a rigid or positive type coupling is provided between the motor and the system flywheel it has been found that a synchronous motor of a horsepower that is required to rotate the flywheel at synchronous speed does not have sufficient torque to accelerate the flywheel from this 1790 revolutions per minute up to the 1800 revolutions per minute. This is due to the fact that when the poles of the rotor of the synchronous motor are arranged relative to the stator poles in a position to give maximum forward torque (FIG. 5) the resistance to this forward torque exhibited by the larged inertia mass of the flywheel overcomes the magnetic attraction between the rotor and stator poles and causes the rotor to slow down relative to the stator. Since the system is rotating at approximately 1790 revolutions per minute and the stator poles are rotating at 1800 revolutions per minute a period of time will elapse before the rotor will again be positioned relative to the stator to develop a maximum forward torque. During this time of minimum torque (FIG. 6) the system flywheel has a tendency to slow down to less than 1790 revolutions per minute and repeated positions of maximum forward torque and minimum forward torque of the synchronous motor will eventually cause the system to completely stop. It is this undesirable characteristic exhibited by a synchronous motor driving a large inertia mass which has previously required the use of an exceptionally large and expensive synchronous motor or an induction motor. With the use of induction type motors which have a sufficient forward torque characteristic to accelerate the system flywheel, the system is supplying current at less than sixty cycles and as was previously pointed out this is undesirable in the use of many electronic machines. With applicant's device it is possible to utilize a synchronous type motor of the horsepower required to drive the system at synchronous speed which will also accelerate the system flywheel from some speed less than synchronous speed up to synchronous speed.

If we again assume that the engine is driving the system and the utility power is reestablished, the engine is disconnected by deenergizing the magnetic clutch and the synchronous motor switch is closed to accept the utility power provided. While the engine was driving the system the flywheel coupling element 18 was driving the bumper 44 of the generator coupling element 17. At the instant current is supplied to the motor the bumpers 44 are supplying the torque to drive the system. These bumpers must move along the length of the slots 48 until they contact the other ends of the slots. During the time of interruption of rotative power to the flywheel the flywheel slows down to, let us say, 1790 revolutions per minute. Since the flywheel is rotating at less than synchronous speed and the bumpers 44 are rotating at synchronous speed (FIG. 5) the bumpers will catch up to the flywheel coupling element. When these bumpers strike the flywheel coupling element energy is provided to the flywheel accelerating it from, let us say, 1790 revolutions per minute to 1795 revolutions per minute. At 1795 revolutions per minute the synchronous motor does not have sufficient torque to continue to accelerate the system flywheel to synchronous speed and the rotor decelerates relative to the stator. However, since the lash coupling provided in applicant's invention allows relative rotation between the motor rotor and the system flywheel, the system flywheel because of its large inertia mass will continue to rotate at approximately 1795 revolutions per minute or perhaps 1794 revolutions per minute during the time it takes the motor to change from one position of maximum forward torque to the next. The rotor, in the meantime, decelerates relative to the flywheel until it is pulled into the next position of maximum forward torque (FIG. 7). When the rotor and stator are again aligned for maximum forward torque the rotor approaches synchronous speed, catches up with the system flywheel and again provides an additional pulse of energy to the system flywheel. In this pulse of energy the flywheel may be accelerated from 1794 revolutions per minute to 1799 revolutions per minute. It is again possible that the synchronous motor does not have sufficient forward torque to accelerate the system flywheel up to the 1800 revolutions per minute and the rotor will pull out of magnetic engagement with the stator and the lash coupling will allow the rotor to decelerate relative to the system flywheel. The flywheel will continue, because of its large inertia mass, to rotate at approximately 1799 revolutions per minute. When the rotor is arranged with the stator to exhibit the maximum forward torque, the rotor is accelerated toward synchronous speed until the coupling elements are in engagement thereby providing the flywheel with another pulse of energy. This time the energy supplied by the synchronous motor will accelerate the system flywheel to synchronous speed and once at synchronous speed the motor will continue to rotate the system flywheel at 1800 revolutions per minute and the generator will supply the load with sixty cycle current.

This operation of the lash coupling in accelerating the system flywheel to synchronous speed occurs in a matter of seconds and the power to the load is not affected to the extent that it is unsuitable for use in sensitive control apparatus or the like.

While only two particular embodiments and one application of the invention have been disclosed in the drawings and described in the specification, the invention should not be limited to these particular embodiments and this particular application and should be given the limit of protection provided by the appended claims.

What is claimed is:

1. The combination comprising: a synchronous motor having a stator and a rotor driven by said stator, said rotor having a number of positions relative to said stator wherein a maximum forward torque is exhibited by said rotor; a load; and lost motion means connecting said load to said rotor for rotation therewith, said means permitting independent relative rotation between said load and said rotor in an amount substantially equal in mechanical degrees to the distance in mechanical degrees between positions of said stator and said rotor wherein said maximum forward torque exists.

2. An emergency electric power system comprising: an internal combustion engine; a rotatable inertia mass; a clutch having a pair of parts connected respectively to said engine and said inertia mass for selectively connecting and disconnecting said engine and said inertia mass; a generator connected to said inertia mass for rotation therewith; a synchronous motor; and lost motion means having a pair of elements connected respectively to said generator and said motor, said means permitting a limited amount of independent relative rotation between said generator and motor.

3. The combination with a source of utility electric power of an emergency electric power system comprising: an internal combustion engine; a rotatable inertia mass; a clutch having a pair of parts connected respectively to said engine and said inertia mass for selectively connecting and disconnecting said engine and said inertia mass; a generator connected to said inertia mass for rotation therewith; a synchronous motor having a stator and a rotor driven by said stator, said rotor having a number of positions relative to said stator wherein a maximum forward torque is exhibited by said rotor; and lost motion means connecting said generator to said rotor for rotation therewith, said means permitting independent relative rotation between said rotor and said generator in an amount substantially equal in mechanical degrees to the distance in mechanical degrees between said positions of maximum forward torque of said rotor.

4. An emergency electric power system comprising:

an internal combustion engine; a rotatable inertia mass; a clutch having a pair of parts connected respectively to said engine and said inertia mass for selectively connecting and disconnecting said engine and said inertia mass; a generator; a synchronous motor having a stator and a rotor driven by said stator, said rotor having a number of positions relative to said stator wherein a maximum forward torque is exhibited by said rotor; and means connecting said rotor, said generator and said inertia mass for rotation, said means including a lost motion means permitting independent relative rotation between said rotor and said flywheel limited to an amount substantially equal in mechanical degrees to the distance in mechanical degrees between positions of maximum forward torque of said rotor.

References Cited in the file of this patent

UNITED STATES PATENTS

| | | |
|---|---|---|
| 724,645 | Wood | Apr. 7, 1903 |
| 2,688,704 | Christenson | Sept. 7, 1954 |

FOREIGN PATENTS

| | | |
|---|---|---|
| 11,957 | Great Britain | of 1912 |
| 610,615 | Great Britain | Oct. 19, 1948 |